April 21, 1936.     S. J. ZAND     2,038,021
VIBRATION RECORDING INSTRUMENT
Filed Aug. 4, 1932     4 Sheets-Sheet 1
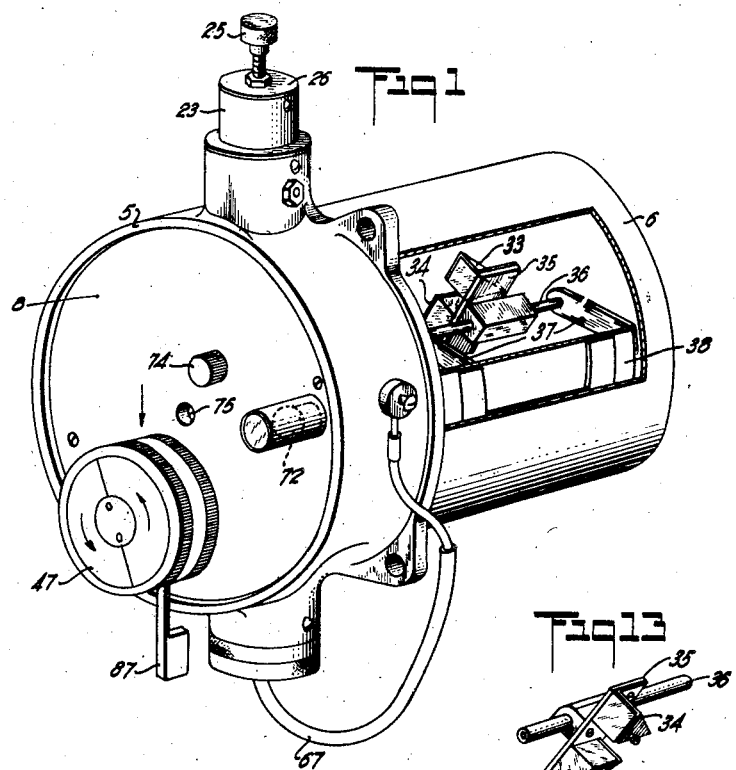
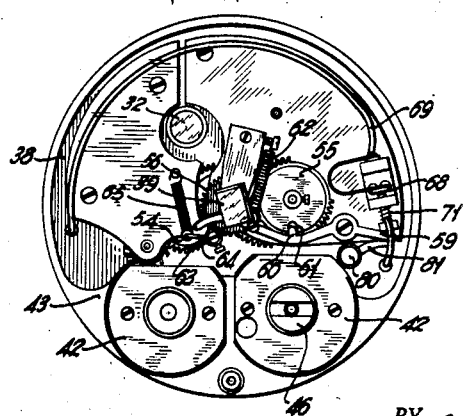
INVENTOR.
STEPHEN J. ZAND.
BY Stephen Cerstvik.
ATTORNEY April 21, 1936.　　　S. J. ZAND　　　2,038,021
VIBRATION RECORDING INSTRUMENT
Filed Aug. 4, 1932　　4 Sheets-Sheet 2
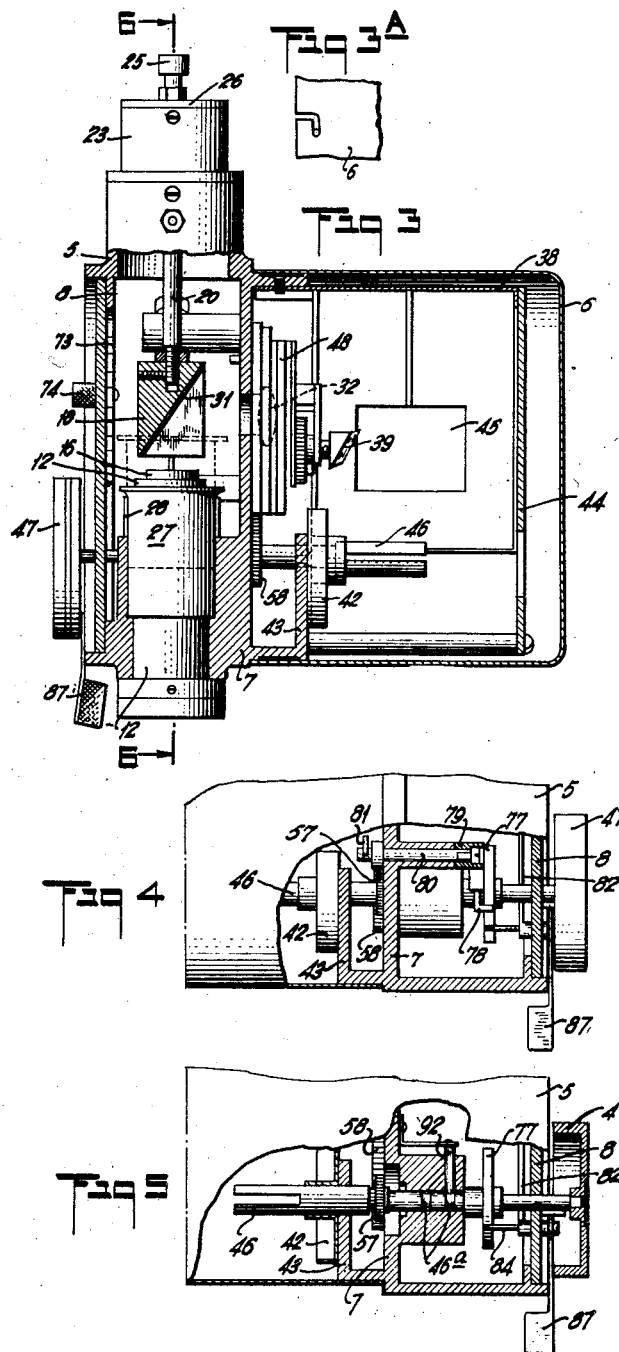
INVENTOR.
STEPHEN J. ZAND.
BY Stephen Cerstvik.
ATTORNEY April 21, 1936.  S. J. ZAND  2,038,021
VIBRATION RECORDING INSTRUMENT
Filed Aug. 4, 1932   4 Sheets-Sheet 3
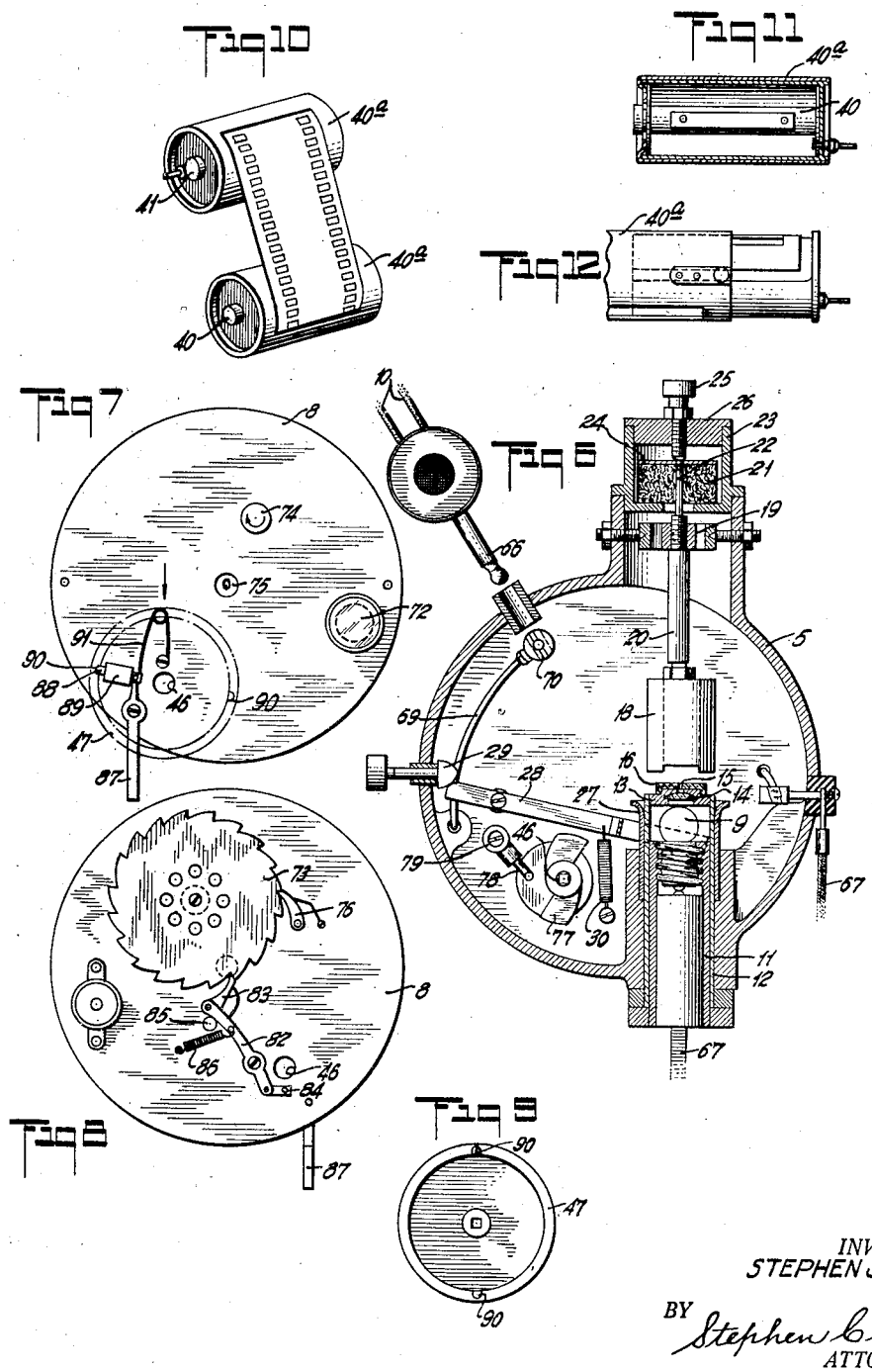
INVENTOR.
STEPHEN J. ZAND.
BY Stephen Cerstvik.
ATTORNEY.

April 21, 1936.  S. J. ZAND  2,038,021
VIBRATION RECORDING INSTRUMENT
Filed Aug. 4, 1932  4 Sheets-Sheet 4

INVENTOR.
STEPHEN J. ZAND.
BY Stephen Cerstvik.
ATTORNEY

Patented Apr. 21, 1936

2,038,021

UNITED STATES PATENT OFFICE 2,038,021

VIBRATION RECORDING INSTRUMENT

Stephen J. Zand, Forest Hills, N. Y., assignor to Bendix Aviation Corporation, South Bend, Ind., a corporation of Delaware Application August 4, 1932, Serial No. 627,498

6 Claims. (Cl. 234—5.6)

This invention relates to recording instruments, and more particularly to means for recording vibrations.

One of the objects of the present invention is to provide novel means for obtaining a record of vibrations imparted to a member from which record the form, amplitude and frequency of such vibrations may be quickly and readily ascertained.

Another object of the invention is to provide a novel instrument of the above character which is particularly adapted for recording the vibrations of a member constituting an element of a movable structure, such as an airplane.

Still another object is to provide a novel vibration recording instrument of such size, shape and weight that the same may be readily substituted on an instrument board for another instrument without substantially altering the vibration characteristics of said board.

A further object is to provide a novel recording device which is so constructed as to permanently record the amplitude along two axes, the form, and the frequency of the vibrations of a member on which the device is mounted.

A still further object is to provide a vibration recording instrument of the photographic type employing novel means for controlling the operations of the same.

The above and further objects and novel features of the invention will more fully appear from the following detailed description when taken in connection with the accompanying drawings. It is to be expressly understood, however, that the drawings are for the purpose of illustration only and are not designed as a definition of the limits of the invention, reference being primarily had for this purpose to the appended claims.

In the drawings wherein like reference characters refer to like parts throughout the several views:

Fig. 1 is a perspective view, with a portion of the casing cut away, illustrating a novel recording instrument embodying the present invention;

Fig. 2 is a transverse view showing the clockwork employed in carrying out the present invention;

Fig. 3 is a side elevation, partly in section and with certain parts removed, of the instrument shown in Fig. 1;

Fig. 3a is a detail view showing one means of securing the rear casing to the instrument;

Fig. 4 is a detail view, partly in section and with parts broken away, of one form of manual control mechanism that may be employed;

Fig. 5 is a detail view, partly in section, of the manual control mechanism taken on a slightly different line than Fig. 4;

Fig. 6 is a view, partly in section, taken on line 6—6 of Fig. 3;

Fig. 7 is a partial front view showing one form of safety lock for the control mechanism;

Fig. 8 is a rear view of the face of the instrument showing a preferred form of exposure indicating mechanism;

Fig. 9 is a detail view of a control knob; Figs. 10, 11 and 12 are detail views of the film and spools therefor;

Fig. 13 is a perspective view of a portion of the optical system that may be employed;

Figure 14:
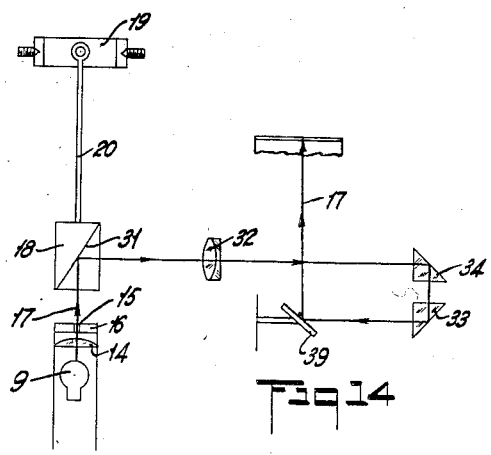
Fig. 14 is a diagrammatic view showing the path of the light beam in the instrument illustrated.

Only one embodiment of the invention has been illustrated in the form of a vibrograph adapted to be mounted on the instrument board of an aircraft or the like and, as shown (Fig. 3), the same comprises a housing 5, to the rear of which is detachably secured by means of a pin and slot connection (Fig. 3a) a metal cup 6, the members 5, 6 constituting the instrument case. Housing 5 embodies a wall 7 constituting a partition which divides the instrument case into rear and front compartments, the latter being closed by a disc 8 secured in any suitable manner to the front end of housing 5. The case is adapted to be mounted on a vibrating member and, accordingly, when so mounted it is subjected to the vibrations of said member.

Means are provided within the casing 5, 6 to project a beam of light and, since said means are mounted within the casing, the light beam will be subjected to the vibrations of the member on which the casing is mounted. For this purpose, there is employed a lamp 9 such as a focusing type flash light bulb connected by means of leads 10 (Fig. 6) and other wiring to be more fully described hereinafter, to a suitable source of electrical energy such as a battery (not shown). The lamp is mounted in any convenient manner in the lower portion of housing 5 and in the front compartment substantially intermediate walls 7 and 8. The lamp socket 11 has secured thereto, in a position to surround lamp 9, an opaque sleeve 12 which extends upwardly and carries, adjacent its upper end, a member 13 holding a condenser lens 14 which directs the light beam through a small aperture 15 in an opaque cup-like member 16 secured to the upper side of member 13.

As noted above, the casing 5, 6 and lamp 9 and hence the light beam illustrated by the irregular line 17 (Fig. 14) are all subjected to the vibrations of the member on which said casing is mounted. A reference member having a motion which is independent of the vibration frequencies, that is, which is relatively stationary with respect to the axes along which it is desired to measure the amplitude of the vibrations, is provided in order that the movements of the light beam, and hence the amplitude, form and frequency of vibrations to which said beam is subjected, may be recorded. The reference member will be referred to as being a stationary member since it has no appreciable movement in a horizontal plane passing through the center of mass of said member, although said plane moves in unison with the vertical component of the vibrations and hence in unison with a parallel plane passing through the source of light. The reference member is constituted by a universally suspended pendulum contained within a casing whereby said pendulum remains stationary when the casing vibrates in two mutually perpendicular and horizontal directions, but no relative movement takes place between the pendulum and casing in a vertical direction. In other words, the pendulum moves in unison with the casing when the latter vibrates in a vertical direction. It is thus possible to obtain a faithful record of the horizontal vibrations in two mutually perpendicular vertical planes, and such record can be compared with an arbitrary standard to secure the desired information.

In order to provide said stationary reference member, the present instrument preferably is fitted with a pendulum 18 having a natural frequency such that it is substantially independent of the frequencies of vibrations imparted to the instrument case. The pendulum is mounted by means of a jeweled bearing, universal joint 19 attached in any suitable manner to the upper portion of housing 5. In order that pendulum 18 and the pendulum rod 20 may be independent of the vibration frequencies, the same should be so formed as to have a natural frequency of substantially one-fifth or less of the lowest frequency which it is desired to record. For example, if the instrument is employed on an airplane instrument board, the frequency of the pendulum should be one-fifth or less of the lowest frequency of the instrument board. It has been found that if the natural period of the pendulum is less than five times the period of the vibrations to be measured, the pendulum will not remain stationary in a horizontal plane and the resultant record will be apparent rather than a true measure of the vibrations.

In order to adapt the present instrument for use in other than an upright position such as occurs, for example, when the same is mounted on the instrument board of an aircraft, damping means are provided for preventing excessive movement of the pendulum for maintaining the same in the path of the light beam and, this, without materially affecting the degree of freedom of relative movement of said pendulum. Preferably, such means are constituted by a suitable resilient material such as rubber sponge 21 into which an extension 22 of shaft 20 extends. Said sponge may be compressed to the desired degree in a cup-like container 23 by means of a disc 24 and a thumb screw 25, said container being secured in any suitable manner to housing 5 and having a cover 26 into which screw 25 is threaded.

Preferably, pendulum rod 20 is so mounted within housing 5 that its longitudinal axis is coaxial with aperture 15 and the light beam 17 when the instrument is not being subjected to vibrations. It is also desirable, for the protection of the pendulum bearing 19, to provide means for holding pendulum 18 in a fixed position when the instrument is being transported or during violent maneuvers. Such means are provided in the form of a centralizing sleeve 27 which slidably surrounds the upper portion of sleeve 12 and is adapted to be raised to a position surrounding pendulum 18 by means of a bifurcated lever 28 pivotally mounted on wall 7 and adapted to be actuated by an ogival plunger 29 supported in housing 5 and engaging one end of said lever. Sleeve 27 is operatively associated with lever 28 by means of a pin and slot connection, and is adapted to be normally held in inoperative position by suitable resilient means such as coil spring 30.

As noted above, there is never any relative movement between the pendulum, the light beam and aperture 15 along a vertical axis passing through these members regardless of the vibrations imparted to the instrument. However, when the instrument is subjected to vibration, lamp 9 and beam 17 each have relative movement with respect to pendulum 18 in two mutually perpendicular directions in a horizontal plane disposed substantially at right angles to the vertical line passing through the center of gravity of the pendulum.

Preferably, pendulum 18 is provided on its lower surface with an angularly disposed mirror or other reflecting member for directing the vibrated beam 17 into the rear compartment of the instrument case. As shown, the center portion of pendulum 18 is partially cut away and a mirror 31 is mounted in the groove formed therein, said mirror being disposed at an angle of substantially 45 degrees relative to the axis of rod 20 and beam 17. Mounted in wall 7 of housing 5 is an objective lens 32 through which the light beam reflected from mirror 31 passes into the rear compartment of the instrument case.

It is desirable to provide a vibration record of such size as to render the same readily readable and at the same time provide an instrument of small size. Accordingly, the present invention, when adapted for use on airplanes, for example, preferably includes a plurality of light reflecting members to increase the optical leverage of the vibrated beam without increasing the overall length of the instrument. To this end, there are employed a pair of stationary prisms 33 and 34 (Fig. 1) mounted, at an angle of substantially 30 degrees to the horizontal, on a plate 35 suitably attached to a rod 36 which is fixedly secured at its ends to a pair of brackets 37. The latter are attached to and extend radially inward from a partial cylinder 38 which subtends an arc of substantially 240 degrees and is secured to wall 7 by means of set screws, only one of which is shown. As will be noted in Fig. 14, prisms 33, 34 reflect the light beam through 180 degrees onto a movable mirror 39 to be more fully described hereinafter.

Means are provided for positioning a light-sensitive member or film in the path of the light beam after it leaves mirror 39 in order that a permanent record may be made from which the amplitude, form and frequency of the vibrations under investigation are readily ascertained. For this purpose, there are provided a pair of film carrying casings or spools 40 and 41, each of which is rotatably mounted in a casing 40a which is supported at its inner end and in a suitable holder 42 mounted on a bracket 43 formed integral with the lower portion of wall 7 and at its outer end by means of a plate 44 secured to the outer end of cylinder 38. The film is led from spool 41 to spool 40 over the smooth outer surface of partial cylinder 38, the latter being provided with an opening 45 through which lengths of said film are exposed to the light beam reflected from mirror 39. For moving the film, spool 40 is provided with a central opening having a pin across the diameter thereof which is adapted to be engaged by a bifurcated control shaft 46 (Fig. 2) whereby said spool may be rotated. Shaft 46 slidably extends through wall 7 and disc 8, and is provided on its outer end with a control knob 47.

Figure 15:
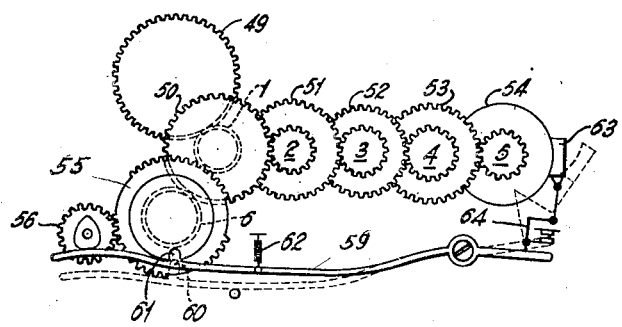
Fig. 15 is a diagrammatic showing of a portion of the clock-work and control mechanism that is preferably employed.

If mirror 39 and the film are relatively stationary, only a plurality of superimposed exposures of the film, as shown at "a", Fig. 1, will be obtained, and it would be impossible to determine the frequency of the vibrations from such a record. On the other hand, if there is continuous relative movement between the two while the light beam is being reflected onto the film, a distorted picture, such as is shown from "b" to "c", Fig. 10, will be recorded and, although the frequency would be readily obtainable therefrom, the determination of the amplitude and the form of the vibrations would involve a tedious application of higher mathematics. The present invention comprehends the use of a mirror and film which are relatively movable during predetermined intervals of time. Additionally, it is desirable to provide an instrument of small weight in order that the same may be mounted on a vibrating member without substantially altering the mass of the member and hence the vibration characteristics thereof. If it is desired to move the film, a relatively large amount of power would be required, and hence the weight of the instrument would be materially increased. Preferably, the present invention includes the use of a normally stationary film, and means are provided for angularly moving the mirror so that the latter will start and stop at predetermined intervals of time during each revolution. To this end, the instrument includes a skeleton clockwork or spring motor 48 comprising a main spring casing and gear 49 (Fig. 15), a step-up gear train including gears 50 to 54 inclusive, a driven gear 55 and a gear 56 to the shaft of which mirror 39 is secured. In order that mirror 39 may be started and stopped at predetermined intervals during each revolution, gear 55 has separated sectors on which no teeth are cut. Thus, when a smooth sector of gear 55 is adjacent gear 56, the latter, and hence mirror 39, will be stationary. The relative sizes of gears 55 and 56 and the number of teeth thereon are proportioned so that an equal number of revolutions will be made by each.

It will be noted that the driving means provided is not a true clockwork since no escapement wheel is employed and that, therefore, the intervals of movement of mirror 39 must be determined by comparison with a standard watch and, in order that these intervals may be maintained constant, means are provided for winding the main spring to a predetermined tension for each exposure. As shown, such means are constituted by a gear 57 (Figs. 4 and 5) secured to shaft 46, said gear being adapted to wind the main spring through an idler gear 58. By turning knob 47, then, through equal angular distances, in a manner to be set forth hereafter, for each exposure, the main spring will thereby be wound to an equal tension for each exposure.

Novel means are provided for releasing the above clockwork after the main spring has been wound and for stopping the same after each revolution of mirror 39. As shown, such means comprise a lever 59 (Figs. 2 and 15) pivoted intermediate its ends and provided with a lug 60 which is adapted to fit into a mating recess 61 formed in a projecting hub portion of gear 55. Suitable resilient means, such as coil spring 62, are provided for normally holding lug 60 into recess 61 thereby preventing the operation of the clockwork. When said lug is withdrawn from the recess, the clockwork will be released for rotating mirror 39 as described above. After one revolution of the driving gear 55, lug 60 will again engage recess 61 and stop the clockwork. This method of abruptly stopping the mechanism would soon prove detrimental to the bearings of gear 55, so means are, therefore, provided in the form of a friction brake for gradually bringing the clockwork mechanism to rest. In the form illustrated, a brake shoe 63 is adapted to engage a friction surface on gear wheel 55 (Figs. 2 and 15) just prior to the instant that lug 60 seats itself in recess 61. Brake shoe 63 is pivotally mounted on a suitable pin and is operatively connected to a lever arm 64, the latter being adapted to be actuated against the resilient effort of a spring 65 by a pin projecting laterally from lever 59 for releasing said brake.

In order to insure that bulb 9 will always be lighted when an exposure is being made, means are provided whereby the same will be lighted and extinguished simultaneously with the starting and stopping of the clockwork described above. The supply lines 10 are connected to the instrument by means of a plug 66, one terminal of which is grounded through casing 5 to one terminal of bulb 9 (Fig. 6). The other terminal of said bulb is connected to the source of power through lead 67 (Fig. 1), normally open switch 68 (Fig. 2) and lead 69 to a socket 70 (Fig. 6) into which plug 66 is adapted to be inserted. Switch 68 is normally held in open position by means of a spring 71 and is adapted to be closed against the efforts of said spring by lever 59 when the latter is actuated for releasing the clockwork. A small bulb 72 (Fig. 1) may be included in the above circuit for indicating when the instrument is in operation.

Means for indicating the number of exposures made on the roll of films in use are provided and, as shown, such means comprise a dial 73 (Fig. 8) in the form of a ratchet wheel mounted on the inner face of plate 6 and provided with a knob 74 (Fig. 7) for turning the same directly. Dial 73 has a series of numbers engraved thereon, one of which is visible through an opening 75 in plate 6 for indicating the number of exposures made. A spring-pressed pawl 76 is provided for preventing the rotation of said dial in but one direction.

The parts of the instrument thus far described are so proportioned that a new length of film is exposed through window 45, and the main spring of the clockwork is wound to the desired tension for each exposure by one-half revolution of knob 47 and shaft 46. Means are also provided for actuating lever 59 to release the clockwork and for moving dial 73 one notch for each 180 degrees of rotation of shaft 46. The illustrated means for these purposes comprise a cam 77 having two diametrically opposed lobes (Figs. 4 and 6) mounted on said shaft for rotation therewith. For actuating lever 59, one of the lobes of cam 77 engages a crank pin 78 connected to a sleeve 79 which is in turn secured to a rod 80. The latter is rotatably supported by a hub formed in wall 7 and projects rearwardly into the rear compartment of casing 5, 6 where it is provided with a radially projecting cam-shaped pin 81 (Fig. 2) which is adapted to engage and actuate lever 59 upon the angular movement of said rod. Similar means, including a lever 82 (Fig. 8), having a spring-pressed pawl 83 pivotally mounted on the upper end thereof for engaging dial 73, are employed for rotating said dial. Lever 82 is provided at its lower end with a laterally projecting pin 84, which latter is adapted to be engaged by the lobes of cam 77, the pivot point of said lever being such that dial 73 is moved one notch for each one-half revolution of knob 47. Lever 82 is held in normal position against a stop 85 by means of a spring 86.

In order that the operative may know when he has turned knob 47 through exactly 180 degrees as desired, and to prevent the accidental turning of the same, a suitable safety lock is provided and, as shown, the same comprises a downwardly projecting arm 87 (Fig. 7) pivotally mounted on plate 8 and provided at its upper end with a pin 88 (Fig. 7) pivotally connected thereto and adapted to slide in a suitable bearing 89 integral with plate 8. Knob 47 has a pair of recesses 90 (Figs. 7 and 9) spaced 180 degrees apart in the inner periphery of the same into which pin 88 is adapted to fit for locking said knob in position. A suitable spring 91 is provided for yieldingly holding pin 88 in engagement with the inner periphery of knob 47.

When all of the light sensitive film has been exposed, it is necessary to wind the additional tape, provided on spool 41, onto the spool 40 so that the film will not be exposed to light when the same is removed for development, and it is desirable, of course, to do this without setting the instrument into operation. To this end, shaft 46 is mounted for movement in the direction of its longitudinal axis (Fig. 5) so that when the same is moved to its outer position, gear 57 will be out of mesh with gear 58, cam 77 will be free to rotate without engaging crank pin 78, and knob 47 will be clear of pin 88, while the bifurcations on the end of said shaft will remain in engagement with the usual pin in spool 40 for rotating the same. Shaft 46 may be provided with a pair of suitably spaced annular grooves 46a into which the end of a spring-pressed pin 92 is adapted to fit, thereby holding said shaft in the desired positions under normal operating conditions.

Figure 16:
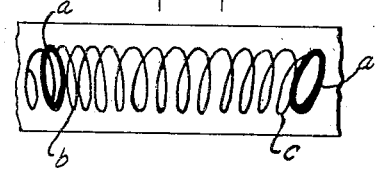
Fig. 16 is a detail view illustrating the type of vibration record which may be obtained by the use of the present invention.

When it is desired to make a record of the vibrations being imparted to the instrument, it is only necessary for the operative to move arm 87 temporarily to the left as seen in Fig. 1 and turn knob 47 in a counter-clockwise direction until the same is again locked by pin 88 engaging one of the recesses 90. By this operation, spool 40 is rotated, thereby exposing a new length of film through window 45, the main spring of the clockwork is wound to a predetermined tension through gears 57, 58, cam 77 engages pin 84 for moving dial 73 one notch, and said cam also engages crank 78, thereby rotating rod 80 and actuating lever 59 by means of pin 81, whereby the circuit to lights 9 and 72 is closed through switch 68, lug 60 is withdrawn from recess 61 and brake shoe 63 is moved out of engagement with wheel 54. The clockwork is then free to rotate mirror 39 while the vibrating beam 17 is being reflected thereon. The mirror will be alternately stopped and rotated as the separated sectors of teeth on driving gear 55 engage gear 56. When mirror 39 is stopped, a number of superimposed exposures are recorded such as at "a" (Fig. 16), from which record the amplitude along two axes and the form of the vibrations are readily ascertained. While there is relative movement between mirror 39 and the film, a record such as fom "b" to "c" is obtained. Since the interval between stops is of predetermined length, as pointed out above, the frequency of the vibrations may be determined by knowing the number of vibrations between stops. When gear 55 has made one complete revolution, and at the instant lug 60 starts to seat itself in recess 61, brake shoe 63 will engage wheel 54, therby slowing down the clockwork mechanism. As lug 60 seats itself into recess 61, switch 68 is opened and the instrument is restored to its normal inoperative state.

Before the instrument is placed in use, it should be properly calibrated by determining the amplification constants for the two axes along which the amplitudes are measured. Any vibrating member which follows a simple harmonic motion of known amplitude, and to which the instrument can be conveniently attached, may be used as a standard. The constants may be readily obtained from a series of records taken with the instrument so mounted.

There is thus provided a vibrograph adapted to visually record vibrations. From the record on the film, the frequency and the amplitude, in two planes, of the vibrations may be readily obtained. The instrument is of very small size and weight and will not change the vibration characteristics of the member, such as an instrument panel, on which it is mounted. Various changes may be made in the details of construction as, for example, in the clockwork gearing, as will be appreciated by those skilled in the art. Reference will accordingly be had to the appended claims for a definition of the limits of the invention.

What is claimed is:

1. In a vibration recording instrument of the type having a casing, means in said casing for projecting a beam of light, a relatively stationary reference member in said casing, means on said reference member for reflecting said beam, a light sensitive film which is relatively stationary during recording, and a rotatable mirror for reflecting said beam onto and along said film, the combination of a spring motor for rotating said mirror, common means for moving the film to provide an unexposed portion thereof in the path of the beam, for simultaneously winding said spring motor, and for releasing said motor to operate the mirror after the film has been moved, and means for automatically stopping said motor after the mirror has made one revolution.

2. In a vibration recording instrument of the type having a casing adapted to be mounted on and subjected to the vibrations of a member, means in said casing for projecting a beam of light, a reference member universally mounted in said casing and having such mass that it remains stationary when the casing is subjected to vibrations in two mutually perpendicular horizontal directions, means on said reference member for reflecting said beam, a light sensitive film which is relatively stationary during recording, and a rotatable mirror for reflecting said beam onto and along said film, the combination of a motor mechanism for rotating said mirror, means for automatically stopping said motor after said mirror has made one complete revolution, and means for stopping said mirror at predetermined intervals of time during each revolution while said motor is running whereby a single continuous trace is produced on the film showing the amplitude and frequency of vibrations in two planes.

3. In a vibration recording instrument according to claim 2, means effective upon operation of the film moving means for simultaneously winding the motor mechanism, releasing said motor mechanism to operate the mirror after it has been wound and a new section of film exposed, and for energizing the light projecting means.

4. In a vibration recording instrument according to claim 2, means effective upon operation of the film moving means for simultaneously winding the motor mechanism, releasing said motor mechanism to operate the mirror after it has been wound and a new section of film exposed, and for energizing the light projecting means, and means for automatically stopping said motor mechanism and for simultaneously deenergizing said light projecting means after the mirror has made a complete revolution.

5. In apparatus of the class described, a light tight casing, means in said casing for projecting a beam of light, a pendulum universally mounted in said casing and having such mass that it remains stationary when the casing is subjected to vibrations in two mutual perpendicular horizontal directions, a member carried by said pendulum for reflecting said beam, means for increasing the optical leverage of said light beam, a rotatable mirror for reflecting said beam, a spring motor including a driving gear having separated sectors of teeth thereon for intermittently actuating said mirror, and a light sensitive film in the path of the beam reflected from the mirror.

6. In a vibration recording instrument, a casing, means in said casing for projecting a light beam, a reference member universally mounted in said casing and having such mass that it remains stationary when the casing is subjected to vibrations in two mutually perependicular horizontal directions, means including a light directing member on said reference member interposed in the path of said beam, a light sensitive film, a rotatable reflector for directing said beam onto said film, a spring motor for imparting intermittent, angular movement to said reflector, a lever pivoted intermediate its ends, means on said lever for stopping said motor after each revolution of said mirror, switch means for said light projecting means adapted to be actuated by said lever, and common means for actuating said lever and for energizing said motor.

STEPHEN J. ZAND.